Sept. 27, 1927.  
J. S. LARSON  
1,643,624  
REGULATOR FOR THE PRESSURE OF A COMMON SOURCE OF FLUID UTILIZED IN OPERATING INDEPENDENT DEVICES  
Original Filed Aug. 17, 1922
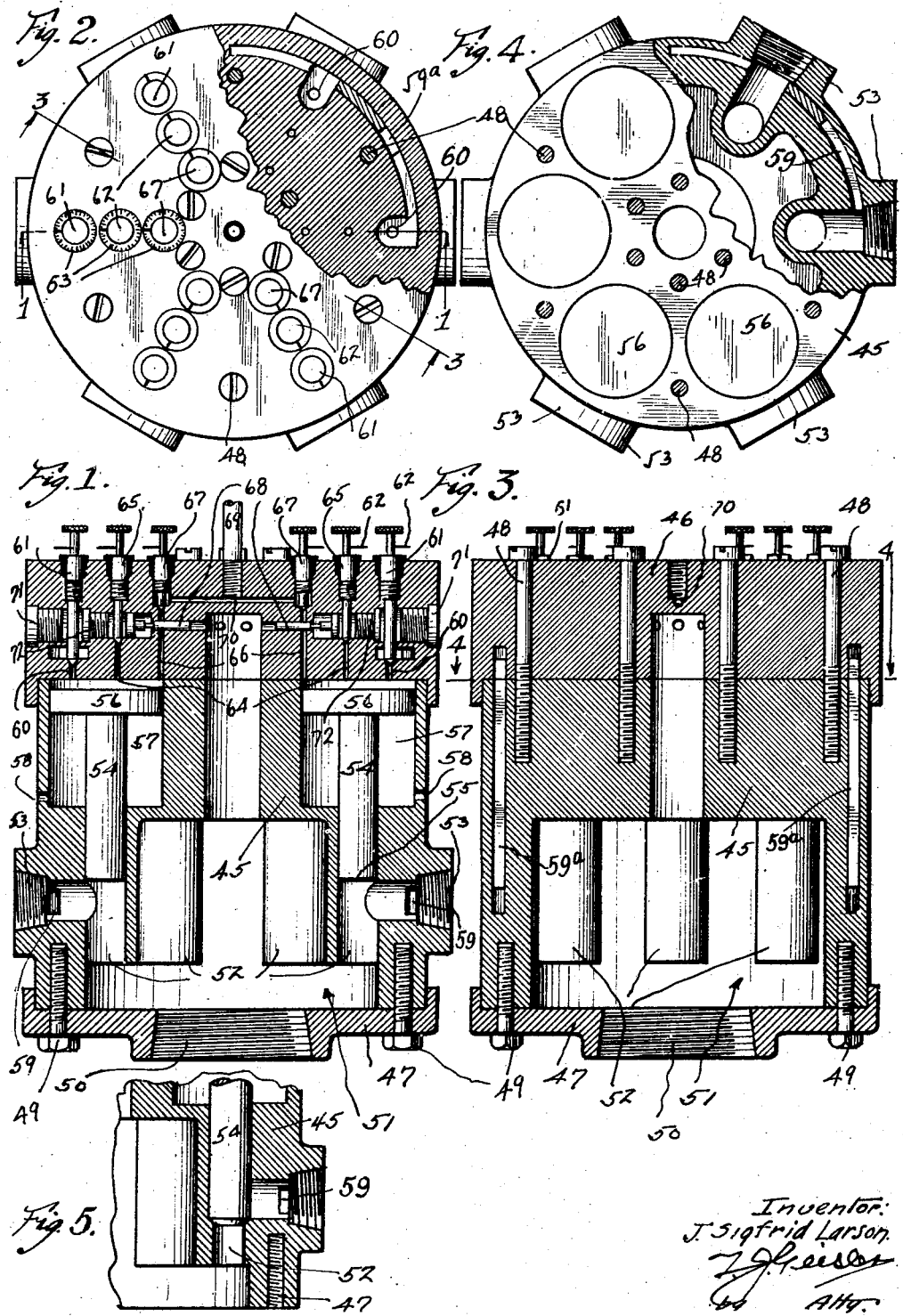

Patented Sept. 27, 1927.

1,643,624

UNITED STATES PATENT OFFICE.

JOHANES SIGFRID LARSON, OF DEE, OREGON.

REGULATOR FOR THE PRESSURE OF A COMMON SOURCE OF FLUID UTILIZED IN OPERATING INDEPENDENT DEVICES.

Original application filed August 17, 1922, Serial No. 595,181. Divided and this application filed June 6, 1925. Serial No. 35,502.

My invention relates to a regulator for pressure from a common source of fluid utilized in operating independent devices.

This application is filed to cover the patentable subject matter divided out of the application for a patent filed by me October 17, 1922, Serial No. 595,181, entitled: Fluid pressure regulator, and which has since matured into a Patent No. 1,581,454, issued April 20, 1926.

The principal object of my present invention is to provide a fluid pressure regulator, whereby fluid pressure from a common source and distributed to operate independent devices may be independently controlled and regulated irrespective of any fluctuation of pressure at said common source—due to the heavy demand of service pipes connected to the said outlet, or from other variations of pressure at the source—so as to deliver the fluid under predetermined pressure to each of the independent devices.

A further object of my invention is to provide a regulator having a single inlet leading into a main chamber from which there are provided a number of outlets controlled by independent devices, and so to arrange the regulator as to provide a constant predetermined pressure in each of said independent outlets, irrespective of the pressure in any of the other outlets.

A further object of my invention is to provide a regulator for fluid pressure having few moving parts operated solely by differences in pressure created within the regulator and in which no devices liable to breakage or wear such as springs, weights, or the like are employed.

A still further object is to provide a regulator for fluid pressure so constructed that fluid will pass through my regulator with a minimum amount of resistance and with the greatest efficiency.

And a still further object of my invention is to provide manually controlled valves adapted to regulate the pressure in each service line quickly and accurately.

I attain the main object of my invention by a regulator comprising a housing provided with a main chamber having a single inlet and a plurality of outlets, each controlled by a pressure actuated valve, these pressure actuated valves comprising a piston head and a stem, the piston head having greater area in cross-section than the stem, the latter traversing and controlling the related outlet, ducts connect the working chamber of said valves with the related outlets of the main chamber, respectively; the said ducts connect with an escape, the outlet of the duct to the escape being also controlled by a pressure-actuated valve, whereby the pressure in the working chamber of the valve cylinder may be varied relatively to that existing in the related outlet, and the operation of the pressure actuated valve located in said outlet is correspondingly regulated.

The working chambers being provided with an escape to the atmosphere and with ducts connecting the working chamber respectively, with said escape. A pressure actuated valve provided in the duct from each working chamber to said escape, said valve comprising a piston head and a stem, the piston head having greater area in cross-section than the stem, the piston head being exposed to the pressure in said working chamber and the stem of the valve bearing in a port open to the main chamber of the regulator. In other words when a predetermined pressure is exceeded in the working chamber, the outlet from the latter is automatically released by the opening of the duct connecting the working chamber with said escape, and the operation of the pressure actuated valve in the related outlet is thus correspondingly regulated. A manual valve is provided in the duct connecting the working chamber of the outlet valve with the last mentioned pressure actuated valve.

The above described and incidental features of my invention are hereinafter fully described with reference to the accompanying drawings, in which:

Fig. 1 is a longitudinal sectional view of the casing and the mechanism enclosed therein and shows that said casing has a single inlet which is common to all of the units but each outlet therefrom is adjustably controlled and independent of the remainder and thus permits fluid to pass through the devices at different pressures; the longitudinal section on which said figure is taken is the line 1—1 of Fig. 2;

Fig. 2 is a plan view of Fig. 1 with a portion of the casing shown as broken away to disclose the arrangement of the fluid connections or ducts;

Fig. 3 is a longitudinal section taken on the line 3—3 of Fig. 2;

Fig. 4 is a section taken substantially on the line 4—4 of Fig. 3 except that a portion of the casing is shown as broken away to further illustrate the arrangement of said fluid ducts or connections; and Fig. 5 is a fragmentary sectional view illustrating a modified arrangement of the piston and its location in cutting off the flow of fluid through the outlet.

As shown in the accompanying drawings my regulator for fluid pressure comprises a cylindrical housing 45 to which heads 46 and 47 are attached, the former by screws 48 and the latter by screws 49 to each end of the housing respectively. A common inlet port 50 is located in the head 47 and opens into the enlarged chamber 51, in which is provided a number of equally spaced cylindrical chambers 52 arranged about the inner circumference of the chamber and parallel with the central axis of the housing 45, and each cylindrical chamber is provided with an outlet 53 extending through the walls of the housing 45 to suitable service pipes, not shown in the drawings. The cylindrical chambers 52 open into piston chambers 57 of somewhat larger diameter in which are provided pistons 56, the stems of the said pistons extending through the chambers 52 and moving therein to close the outlets 53 when in one position.

Each unit of my regulator for fluid pressure is identical in construction and operation and I will hereafter only describe the action of one unit which may be understood to apply to the description and operation of any of the other units.

I provide an exhaust port 58 in the chamber 52 for the release of pressure trapped by the piston 56 in its downward movement. A duct 59 leads into a passageway 59ª in the walls of the housing 46, as shown in Fig. 3 and connects with the duct 60 leading into the working chamber 57 of the piston 56, the duct 60 being controlled by a manually adjustable valve 61 as shown in Fig. 1.

The valve 61 preferably carries an indicator 62 and a scale 63 inscribed on the upper exposed surface of the head 46 as shown in Fig. 2, which is calibrated so as to indicate pounds of pressure in the service line, and thus by positioning the indicator 62 over a calibration in the scale 63, the fluid pressure in that particular service line will be regulated accordingly.

A duct 64 leads from the chamber 57 to a chamber which opens at its smaller end into the main chamber 51, and in which is provided a balanced valve 68 similar in construction to the piston 54, and which controls the flow of pressure through the duct 66, the duct 66 leading through a passageway 70 to an escape 69 to the atmosphere, the said escape 69 being common to all the units of my regulator. A valve 65 is provided for regulating the duct 64, similar in construction to the valve 61.

Removable plugs 71 and 72 are provided in the outer ends of the chamber containing the balance valve 68 for greater convenience in cleaning and inspecting.

I also provide a supplementary valve similar to the before-mentioned valves 61 and 65 adapted to completely shut off the passageway 66 leading to the escape 69.

The operation of my regulator for fluid pressure is as follows:

Fluid pressure entering through the inlet 50 fills the chamber 51 and tends to force the piston 54 upwardly to the position as shown in Fig. 1 and to force the valve 68 inwardly so as to assume the position also as shown in Fig. 1. In this position of the piston and valve, fluid is permitted to pass through the outlet 53 to a service line at full line pressure, and to the chamber 57 through the duct 59, the passage-way 59ª, and the duct 60, assuming all the control valves 61, 65, and 67 to be open to their fullest extent. The piston head 56 having a larger cross-sectional area than its stem 54, an equal amount of pressure will exert a greater force and tend to force the piston and its stem downward thus closing the outlet 59 to the service line and shutting off the pressure in the duct 59, the passageway 59ª, and the duct 60, thus the pressure in the chamber 57 is reduced and the piston 56 is forced upward again by the higher pressure against the stem 54, this action being repeated until an equilibrium is reached between the pressure in the chamber 51 and the pressure in the chamber 57.

The balanced valve 58 also having a greater cross-sectional area on its head than on its stem will function similarly to the piston 56, and an equal or greater amount of pressure will tend to force the valve 68 toward the upper, narrow portion of the chamber 51 and when in the latter position the duct 66 will be opened by the annular groove in the stem of the valve 68 and pressure will be allowed to escape from the chamber 57 through the duct 66, the passageway 70 and the escape 69 to the atmosphere.

As a means of control and regulation of my regulator for fluid pressure, the valve 65 is provided for regulating the pressure acting on the balance valve 68, which controls the amount of pressure flowing through the duct 66 to the escape 69. The valve 67 is also provided for independently regulating the pressure allowed to escape through the said escape 69.

The valve 61 being calibrated in pounds of pressure in the service line controls the amount of pressure allowed to act against the piston 56, and consequently the pressure in the outlet 53 to the said service line.

The valves 65 and 67 are calibrated for adjustment, relative to the valves 61 and are provided to maintain a constant desired pressure as set by the valve 61 in combination with the balance valve 68 irrespective of the fluctuation of pressure in the chamber 57 or 51 due to the heavy demand of the service line or from various causes at the source.

The operation of my regulator in maintaining a constant pressure in the service line irrespective of the pressures in the chamber 51 is attained by the action of the valve 68 in that a decrease in pressure in the chamber 57 will allow the valve 68 actuated by the pressure in the main chamber to close the passageway 66 leading to the escape 69, hence causing the pressure in the said chamber 57 to rise until it reaches the predetermined point set by the valve 61, when the valve 68 will again be actuated by the increased pressure to open the passageway 66 thus maintaining a constant pressure in the chamber 57 and consequently in the outlet 53 and the service line. The valve 68 functions continuously with the fluctuation of pressure to maintain an even pressure against the piston 56.

Referring now to Fig. 5, I show a modification of my invention in the arrangement of the piston stem and its action in cutting off the pressure through the outlet 53. In this modification, the chamber 52 is of slightly smaller diameter below the outlet 53, and the end of the piston stem 54 is beveled, and so constructed that in its operation it will seat against the shoulder in the chamber 52, just below the outlet 53 formed by the smaller diameter of the lower part of the chamber. In this arrangement, I attain a more sensitive adjustment and control of my pressure regulator in that any movement of the piston stem 54 will affect the pressure in the outlet 53.

I claim:

1. In a regulator for the pressure of a common source of fluid utilized in operating independent devices, said regulator comprising a housing provided with a main chamber having a single inlet and a plurality of outlets, a pressure actuated valve in each outlet, said valve comprising a piston head and a stem, the piston head having greater area in cross-section than the stem, the latter traversing and controlling said outlet, ducts connecting the working chamber of said valve with said outlet of the main chamber, respectively, and manual valves controlling the last mentioned ducts whereby the pressure in the working chamber of the valve cylinder may be varied relatively to that existing in the related outlet, and the operation of the pressure actuated valve located in said outlet correspondingly regulated.

2. In a regulator for the pressure of a common source of fluid utilized in operating independent devices, said regulator comprising a housing provided with a main chamber having a single inlet and a plurality of outlets, a pressure actuated valve in each outlet, said valve comprising a piston head and a stem, the piston head having greater area in cross-section than the stem, the latter traversing and controlling said outlet, ducts connecting the working chamber of said valve with said outlet of the main chamber, respectively, an escape to the atmosphere, ducts connecting the working chamber respectively with said escape, a pressure actuated valve in the duct from each working chamber to said escape, said valve comprising a piston-head and a stem, the piston-head having greater area in cross-section than the stem, the piston-head being exposed to the pressure in said working chamber, the stem of the valve bearing in a port open to the main chamber of the regulator, whereby a predetermined pressure in the working chamber of the outlet valve-cylinder is automatically relieved by the opening of the duct connecting the working chamber with said escape, and the operation of the pressure actuated valve in the related outlet is correspondingly regulated.

3. In a regulator for the pressure of a common source of fluid utilized in operating independent devices, said regulator comprising a housing provided with a main chamber having a single inlet and a plurality of outlets, a pressure actuated valve in each outlet, said valve comprising a piston-head and a stem, the piston-head having greater area in cross-section than the stem, the latter traversing and controlling said outlet, ducts connecting the working chamber of said valve with said outlet of the main chamber, respectively, an escape to the atmosphere, ducts connecting the working chambers respectively with said escape, a pressure actuated valve in the duct from each working chamber to said escape, said valve comprising a piston-head and a stem, the piston-head having a greater area in cross-section than the stem, the piston-head being exposed to the pressure in said working chamber, the stem of the valve bearing in a port open to the main chamber of the regulator, whereby a predetermined pressure in the working chamber of the outlet valve-cylinder is automatically relieved by the opening of the duct connecting the working chamber with said escape, and the operation of the pressure actuated valve in the related outlet is correspondingly regulated, and a manual valve in the duct connecting the working chamber of the outlet valve with the last mentioned pressure actuated valve.

4. In a regulator for the pressure of a common source of fluid utilized in operating independent devices, said regulator comprising a housing provided with a main chamber having a single inlet and a plurality of outlets, a pressure actuated valve in each outlet, said valve comprising a piston-head and a stem, the piston-head having greater area in cross-section than the stem, the latter traversing and controlling said outlet, ducts connecting the working chamber of said valve with said outlet of the main chamber, respectively, an escape to the atmosphere, ducts connecting the working chambers, respectively with said escape, a pressure actuated valve in the duct from each working chamber to said escape, said valve comprising a piston-head and a stem, the piston-head having greater area in cross-section than the stem, the piston-head being exposed to the pressure in said working chamber, the stem of the valve bearing in a port open to the main chamber of the regulator, whereby a predetermined pressure in the working chamber of the outlet valve cylinder is automatically relieved by the opening of the duct connecting the working chamber with said escape, and the operation of the pressure actuated valve in the related outlet is correspondingly regulated, a manual valve in the duct connecting the working chamber of the outlet valve with the last mentioned pressure actuated valve, and a supplemental manual valve in the last mentioned duct controlling the outlet therefrom to said escape.

5. In a regulator the pressure of a common source of fluid utilized in operating independent devices, said regulator comprising a housing provided with a main chamber having a single inlet and a plurality of outlets, a pressure actuated valve in each outlet, said valve comprising a piston-head and a stem, the piston-head having greater area in cross-section than the stem, the latter traversing and controlling said outlet, ducts connecting the working chamber of said valve with said outlet of the main chamber, respectively, manual valves controlling the last mentioned ducts whereby the pressure in the working chamber of the valve cylinder may be varied relatively to that existing in the related outlet, and the operation of the pressure actuated valve located in said outlet correspondingly regulated, an escape to the atmosphere, ducts connecting the working chambers respectively with said escape, a pressure actuated valve in the duct from each working chamber to said escape, said valve comprsing a piston-head and a stem, the piston-head having greater area in cross-section than the stem, the piston-head being exposed to the pressure in said working chamber, the stem of the valve bearing in a port open to the main chamber of the regulator, whereby a predetermined pressure in the working chamber of the outlet valve-cylinder is automatically relieved by the opening of the duct connecting the working chamber with said escape, and the operation of the pressure actuated valve in the related outlet is correspondingly regulated, a manual valve in the duct connecting the working chamber of the outlet valve with the last mentioned pressure actuated valve, and a supplemental manual valve in the last mentioned duct controlling the outlet therefrom to said escape.

J. SIGFRID LARSON.